(12) United States Patent
Enomoto et al.

(10) Patent No.: US 6,883,850 B2
(45) Date of Patent: Apr. 26, 2005

(54) STRUCTURE FOR ACCOMMODATING CD CHANGER

(75) Inventors: Kenichiro Enomoto, Saitama (JP);
Takayuki Shimazaki, Saitama (JP);
Hideo Ochiai, Saitama (JP)

(73) Assignee: Honda Access Corporation, Saitama (JP)

( * ) Notice: Subject to any disclaimer, the term of this patent is extended or adjusted under 35 U.S.C. 154(b) by 0 days.

(21) Appl. No.: 10/634,987

(22) Filed: Aug. 6, 2003

(65) Prior Publication Data

US 2004/0117806 A1 Jun. 17, 2004

(30) Foreign Application Priority Data

Aug. 7, 2002 (JP) ........................................ 2002-229978
Aug. 7, 2002 (JP) ........................................ 2002-229979

(51) Int. Cl.$^7$ .......................... B60R 11/02; G11B 17/22
(52) U.S. Cl. .................................. 296/37.1; 369/30.64
(58) Field of Search .............................. 296/37.1, 37.8; 224/423, 427, 929; 369/30.64, 30.67, 30.69, 30.84

(56) References Cited

U.S. PATENT DOCUMENTS

| 4,087,126 | A | * | 5/1978 | Wynn .......................... 296/37.8 |
| 5,107,114 | A | * | 4/1992 | Nishioka et al. ............. 250/306 |
| 5,481,513 | A | * | 1/1996 | Takamatsu et al. ....... 369/30.84 |
| 5,583,834 | A | * | 12/1996 | Kanada et al. ............. 369/13.2 |
| 6,331,026 | B1 | * | 12/2001 | Adsit et al. ................. 296/37.7 |
| 6,398,327 | B1 | * | 6/2002 | Momoze ................... 312/319.1 |
| 6,502,884 | B2 | * | 1/2003 | Shimazaki et al. ........ 296/37.1 |

FOREIGN PATENT DOCUMENTS

| EP | 0652129 | 5/1995 |
| JP | 62-288739 | 12/1987 |
| JP | 04-353690 | 12/1992 |
| JP | 09-039673 | 2/1997 |
| JP | 2002-87358 | 3/2002 |
| JP | 2002-093133 | 3/2002 |

* cited by examiner

Primary Examiner—D. Glenn Dayoan
Assistant Examiner—Greg Blankenship
(74) Attorney, Agent, or Firm—Arent Fox, PLLC.

(57) ABSTRACT

In a structure of accommodating a CD changer, in which the CD changer biased for turning toward a protruding position is covered with a lid plate closing an open end of an accommodating recess in a state in which the CD changer is in an accommodated position, an engagement portion is provided on the lid plate mounted to a support frame so that it can be slid between a disengaged position and an engaged position. A locking portion is provided on each of base plates so that the locking portion engages with the engagement portion in a state in which the lid plate is at the engaged position, and the engagement with the engagement portion is released in response to the sliding of the lid plate toward the disengaged position. A locking mechanism capable of locking the lid plate in the engaged position and releasing the locked state by a manual operation is provided between the lid plate and the support frame. Thus, it is possible to ensure that the CD changer cannot be turned undesirably to the protruding position.

5 Claims, 20 Drawing Sheets

STRUCTURE FOR ACCOMMODATING CD CHANGER

BACKGROUND OF THE INVENTION

1. Field of the Invention

The present invention relates to a structure for accommodating a CD changer, comprising: an accommodating recess which is provided in a luggage-chamber forming wall forming a luggage chamber and which accommodates a CD changer having an opening in its front surface for insertion and withdrawal of a CD; and a turning support means which is provided between a support frame for supporting the CD changer in a floating manner and a pair of left and right stationary base plates; the turning support means being capable of turning the CD changer between a protruding position in which the front surface of the CD changer protrudes from an inner surface of the luggage-chamber forming wall into the luggage chamber and a accommodated position in which the CD changer is accommodated in the accommodated recess; the turning support means being adapted to bias the CD changer toward the protruding position; the CD changer being covered with a lid plate adapted to close an open end of the accommodating recess in a state in which the CD changer is in the accommodated position.

2. Description of the Related Art

A conventional accommodating structure is already known from Japanese Patent Application Laid-open No. 2002-87358.

In the conventional structure, when the CD changer is turned from the accommodated position to the protruding position, the engagement between the support frame and the base plates is released by pushing in an operating portion facing a window provided in the lid plate. In such arrangement, there is a possibility that the engagement between the support frame and the base plates may be released due to the vibration of a vehicle body, whereby the CD changer may be turned undesirably from the accommodated position to the protruding position.

SUMMARY OF THE INVENTION

Accordingly, it is an object of the present invention to provide a structure for accommodating a CD changer, wherein the CD changer is prevented from being undesirably turned to the protruding position.

To achieve the above object, according to a first feature of the present invention, there is provided a structure for accommodating a CD changer, comprising: an accommodating recess which is provided in a luggage-chamber forming wall forming a luggage chamber and which accommodates a CD changer having an opening in its front surface for insertion and withdrawal of a CD; and a turning support means which is provided between a support frame for supporting the CD changer in a floating manner and a pair of left and right stationary base plates; the turning support means being capable of turning the CD changer between a protruding position in which the front surface of the CD changer protrudes from an inner surface of the luggage-chamber forming wall into the luggage chamber and a accommodated position in which the CD changer is accommodated in the accommodated recess; the turning support means being adapted to bias the CD changer toward the protruding position; the CD changer being covered with a lid plate adapted to close an open end of the accommodating recess in a state in which the CD changer is in the accommodated position; wherein an engagement portion is provided on the lid plate mounted to the support frame and capable of sliding between a disengaged position on a front side in a longitudinal direction of the CD changer and an engaged position on a rear side in the longitudinal direction; wherein each of the base plates has a locking portion which engages with the engagement portion to maintain the CD changer at the accommodated position in a state in which the lid plate is at the engaged position, and which releases the engagement with the engagement portion, in response to the sliding of the lid plate to the disengaged position, to permit the CD changer to turn to the protruding position; and wherein a locking mechanism capable of locking the lid plate at the engaged position and releasing the locked state by a manual operation is provided between the lid plate and the support plate.

With such arrangement of the first feature, to turn the CD changer from the accommodated position to the protruding position, it is necessary to slide the lid plate from the engaged position to the disengaged position after bringing the locking mechanism into an unlocked state by the manual operation. Therefore, it is possible to reliably prevent the CD changer from being undesirably turned to the protruding position with the vibration of the vehicle body, so that the CD changer is turned to the protruding position only when required.

According to a second feature of the present invention, in addition to the first feature, a click spring is mounted on the support frame and resiliently causes the engagement portion to climb over the click spring during the sliding of the lid plate between the disengaged position and the engaged position. With such arrangement, when the lid plate is slid between the engaged position and the disengaged position, it is required for the engagement portion to climb over the click spring, so that a clicking feeling can be provided, whereby an operator can obtain a reliable operation feeling during the sliding of the lid plate.

According to a third feature of the present invention, in addition to the second feature, the engagement portion is provided on an inner surface of the lid plate to extend in a lateral direction of the CD changer; the locking portion is provided at a front end of each of the base plates so that the engagement portion is engaged with the locking portion from below; and the click spring comprising a leaf spring is fixed to the support frame so that it is opposed to the locking portion from front in a state in which the CD changer is in the accommodated position. With such arrangement, the structure for providing the clicking feeling prevents the size of the support frame from increasing in a thicknesswise direction, thereby preventing the accommodating recess provided in the luggage-chamber forming wall from having a larger depth.

According to a fourth feature of the present invention, in addition to any of the arrangements of the first to third features, the lid plate is provided with a window, and the support frame is provides with an indicator adapted to change the indication of a portion facing the window in response to the sliding of the lid plate between the engaged position and the disengaged position. With such arrangement, the slid position of the lid plate can be reliably recognized by the operator.

According to a fifth feature of the present invention, in addition to the arrangement of the first feature, the CD changer is accommodated in a trunk disposed above a rear fender covering a rear wheel of a motorcycle from above;

the base plates are secured to support legs secured to a vehicle body frame on opposite sides of the CD changer; and the CD changer is supported on the base plates through a floating support means adapted to damp a vibration from the vehicle body frame. With such arrangement, even if a vibration of the vehicle body frame is transmitted to the trunk, the vibration is not further transmitted from the trunk to the CD changer. Instead, the vibration of the vehicle body frame is damped by the floating support means in the trunk and transmitted to the CD changer. Therefore, it is possible to suppress the vibration applied to the CD changer.

The above and other objects, features and advantages of the invention will become apparent from the following description of the preferred embodiment taken in conjunction with the accompanying drawings.

BRIEF DESCRIPTION OF THE DRAWINGS

A preferred embodiment of the present invention will now be described with reference to the accompanying drawings, wherein.

DETAILED DESCRIPTION OF PREFERRED EMBODIMENT OF THE INVENTION

Figure 1:
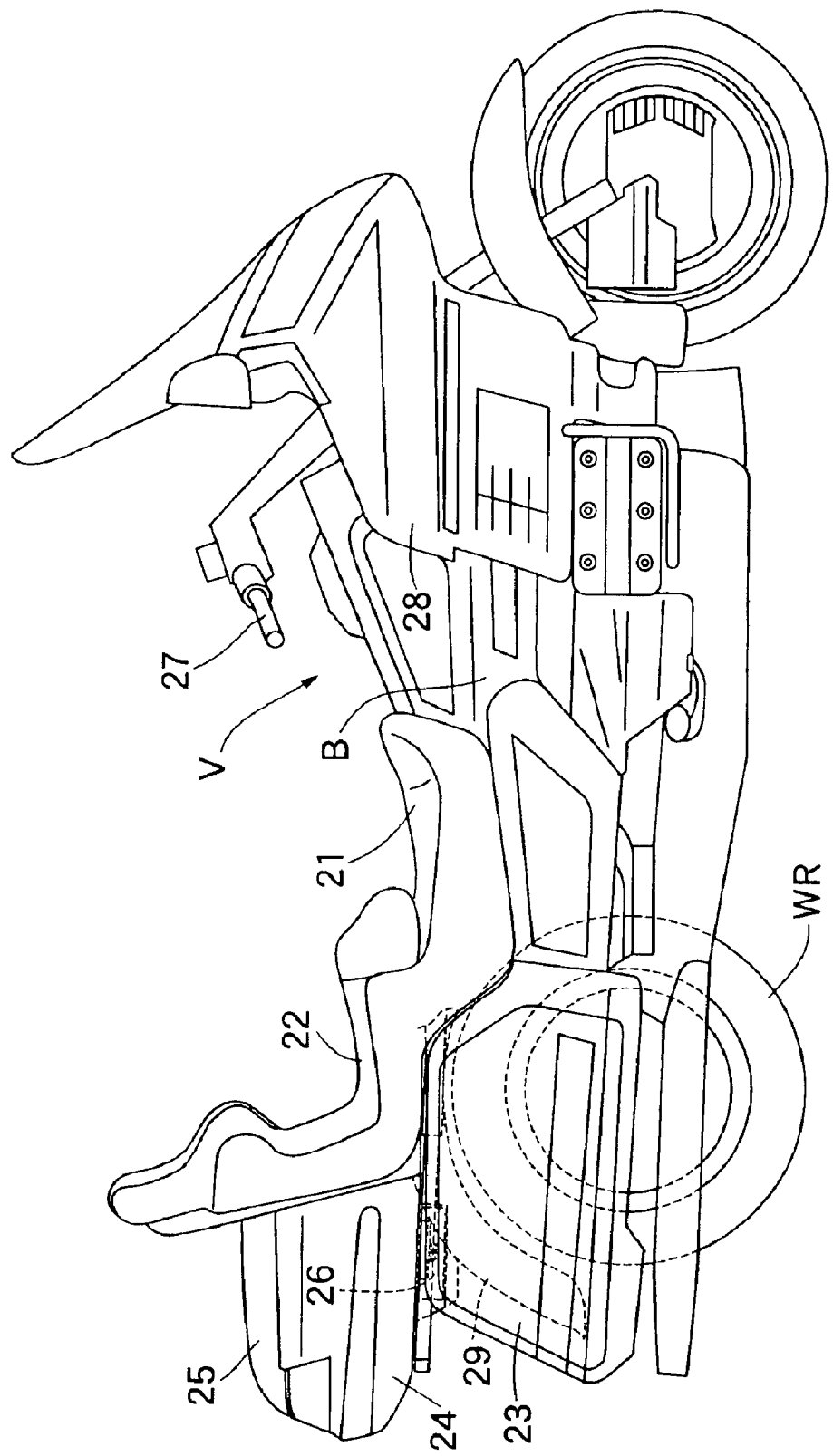
FIG. 1 is a side view of a motorcycle.
Figure 2:
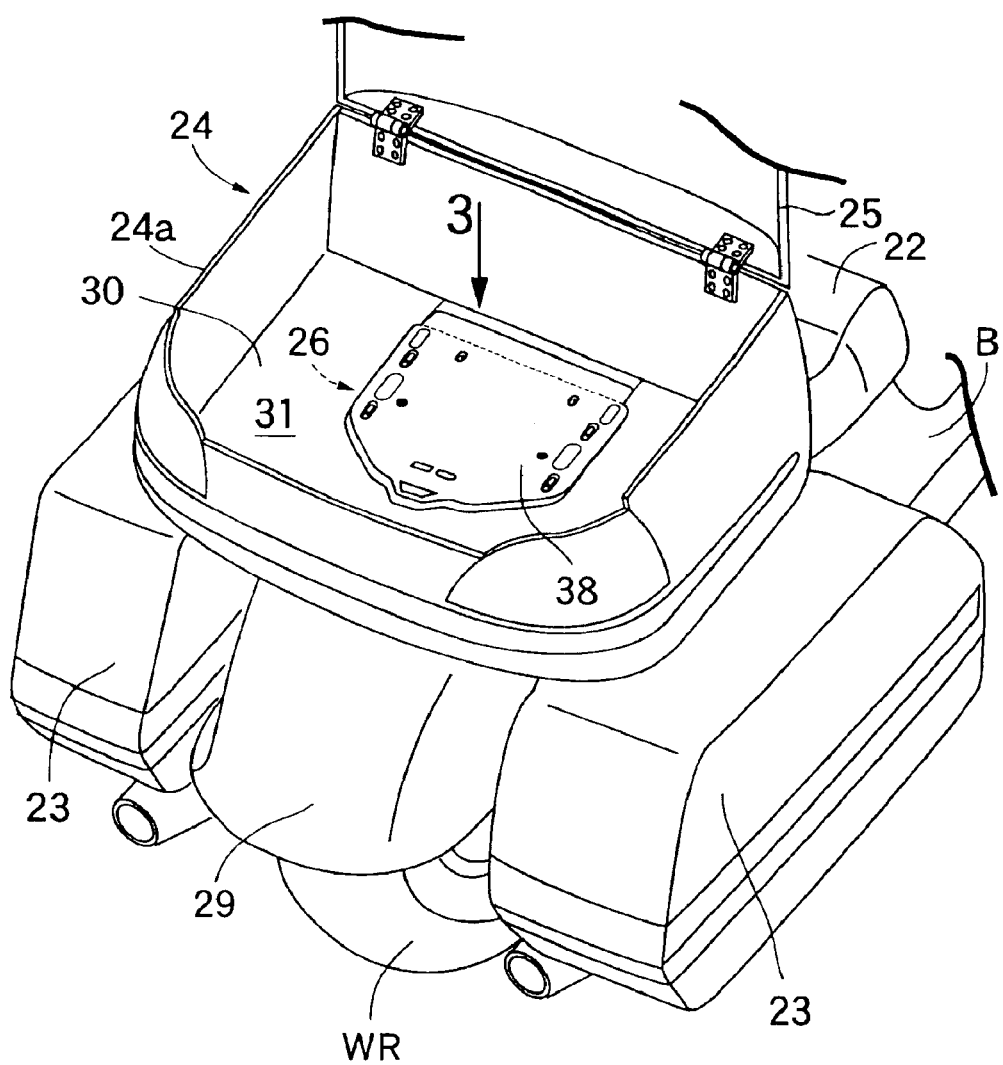
FIG. 2 is a perspective view of a trunk of the motorcycle shown in FIG. 1, with the trunk being in an opened state.
Figure 3:
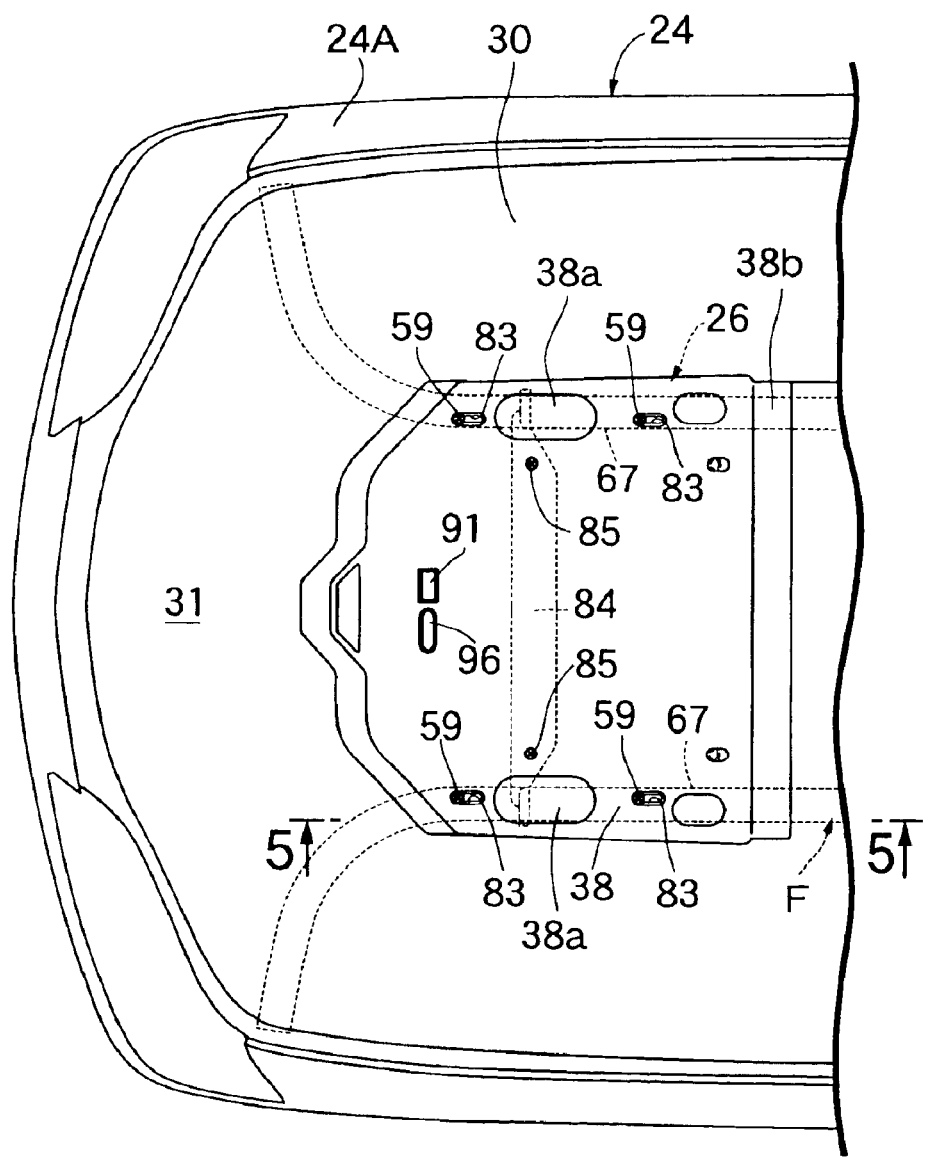
FIG. 3 is a plan view of the trunk shown in FIG. 2 taken in a direction of arrow 3.
Figure 4:
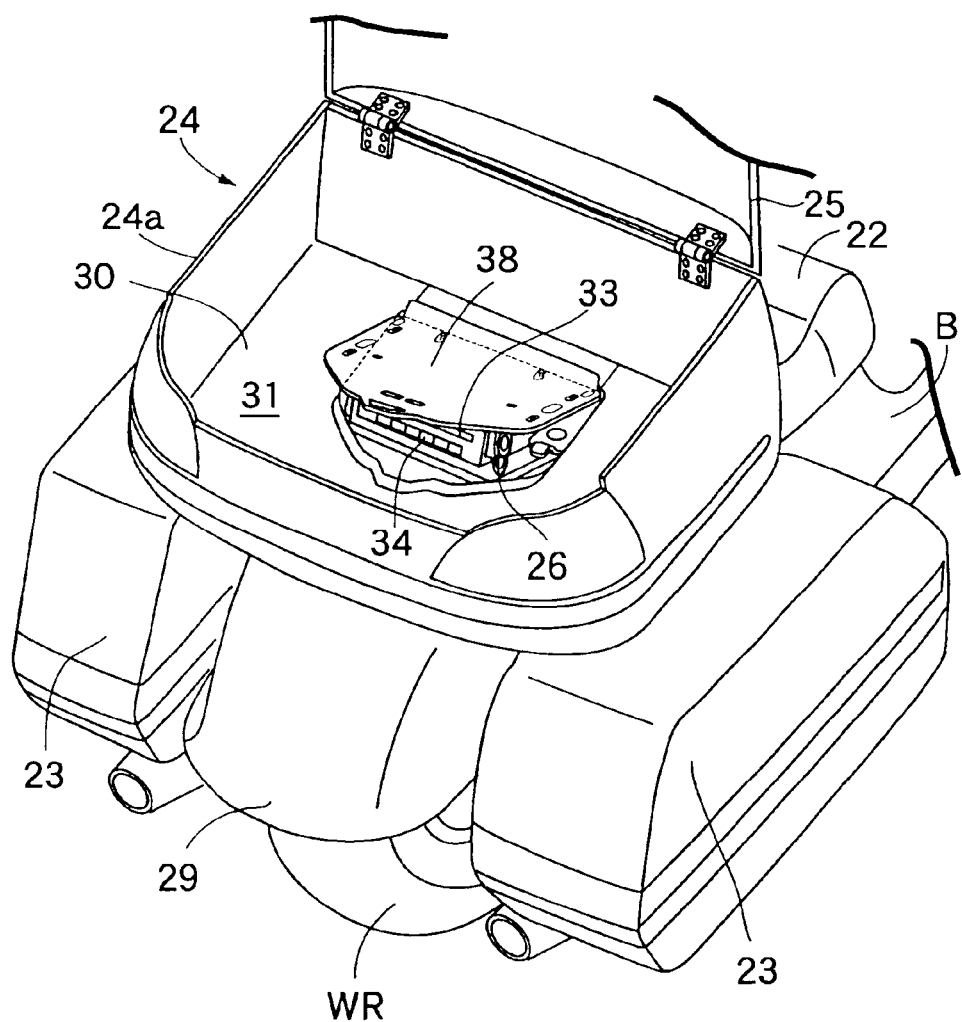
FIG. 4 is a perspective view of the trunk similar to FIG. 2, wherein the CD changer is turned to a protruding position.

Referring to FIGS. 1 to 4, a vehicle body B of a motorcycle V includes a main seat 21 located above a rear wheel WR for a rider to sit on. A pillion seat 22 is located behind the main seat 21 for a tandem rider to sit on. Side bags 23, 23 are disposed on left and right sides of the rear wheel WR. A trunk 24 is disposed above the rear wheel WR behind the pillion seat 22.

The trunk 24 is also disposed above a rear fender 29 configured so that an upper portion of the trunk 24 is openable and covers the rear wheel WR from above. A trunk lid 25 is hinge-coupled to the upper portion of the trunk 24 for opening and closing the upper portion of the trunk 24. A CD changer 26 is disposed in the trunk 24 so that a rider sitting on the main seat 21 and grasping a steering handlebar can hear music through a speaker (not shown) or the like mounted on a cowling 28 or an intercom (not shown) or the like provided within a helmet worn by the rider. Songs on a CD in the CD changer can be selected by the rider and the sound volume and sound quality adjusted by the rider by hand operation, wherein the tandem rider on the pillion seat 22 can also enjoy the music.

Figure 5:
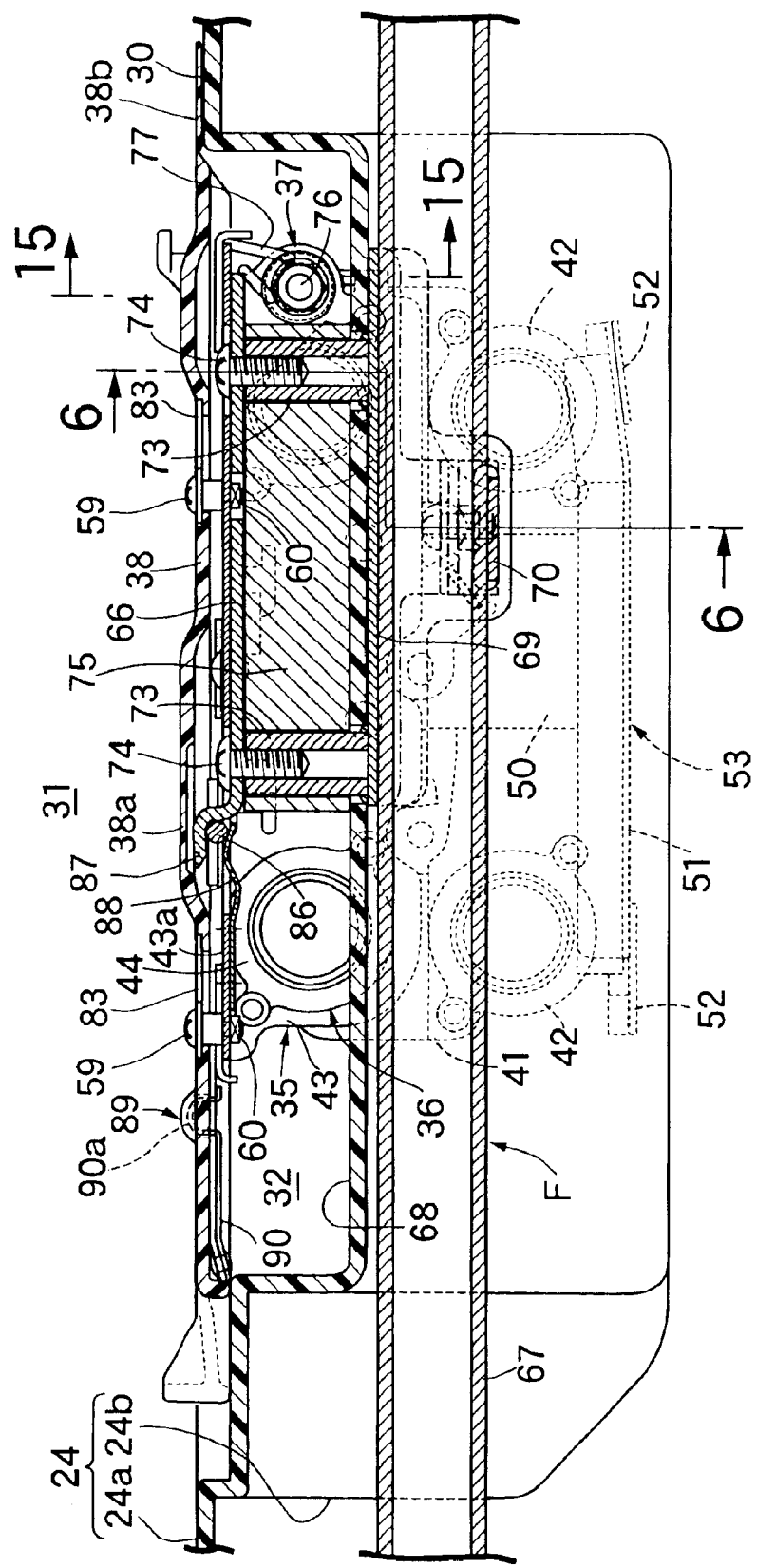
FIG. 5 is an enlarged sectional view of the trunk taken along line 5—5 in FIG. 3.
Figure 6:
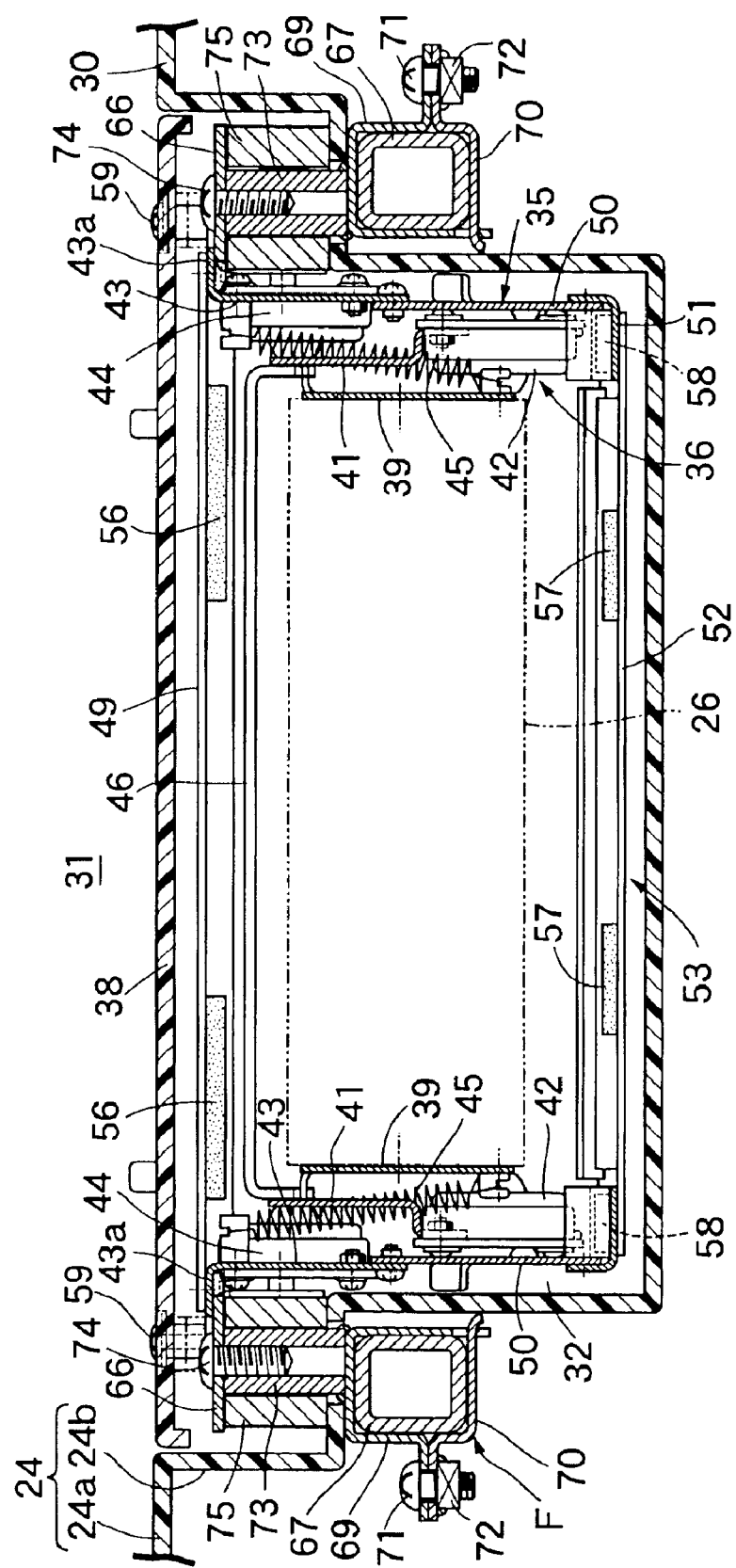
FIG. 6 is a sectional view taken along line 6—6 in FIG. 5.
Figure 7:
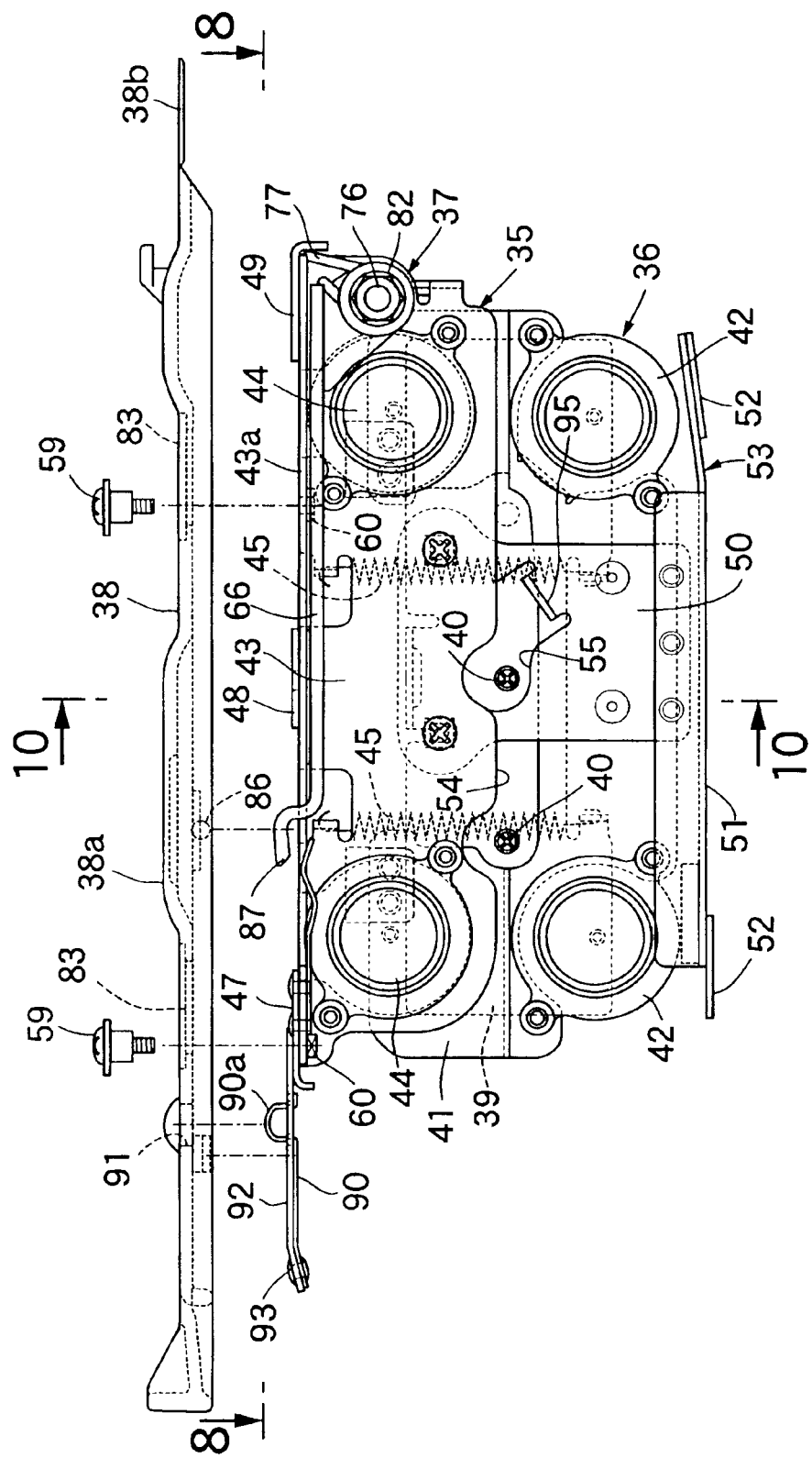
FIG. 7 is a side view of a CD changer support wherein a lid plate is removed.
Figure 8:
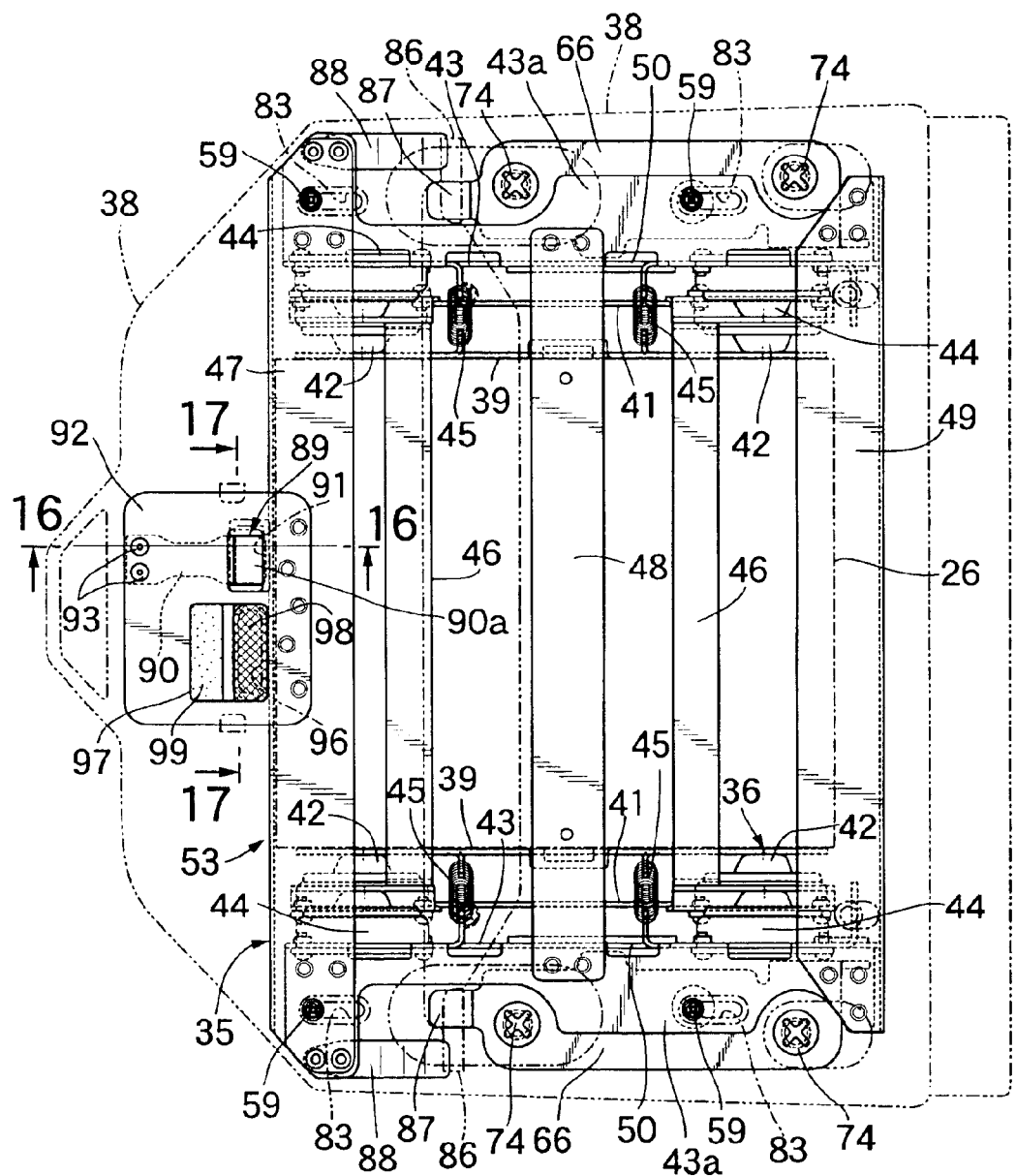
FIG. 8 is a plan view taken along line 8—8 in FIG. 7.
Figure 9:
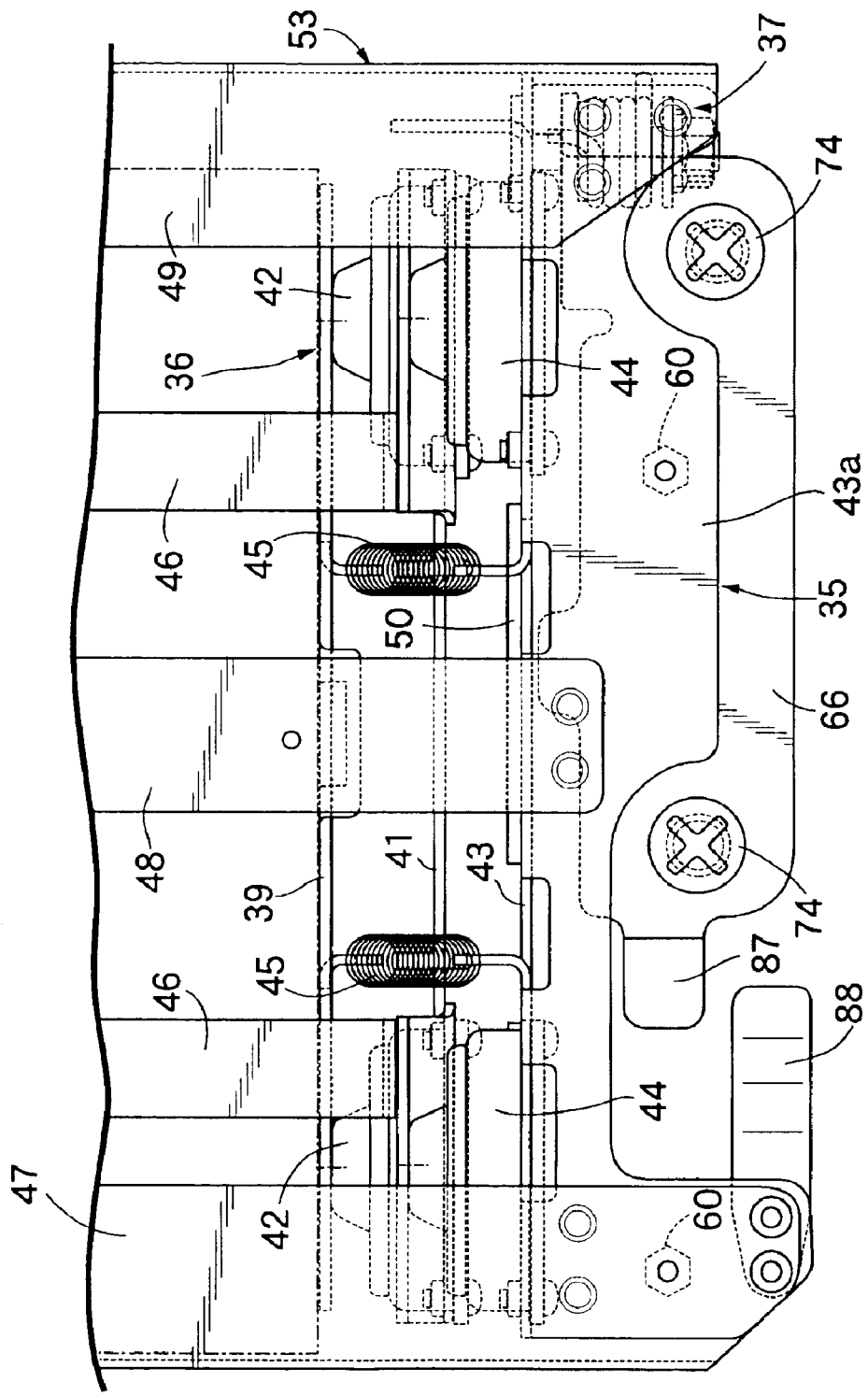
FIG. 9 is an enlarged view of a portion of FIG. 8.
Figure 10:
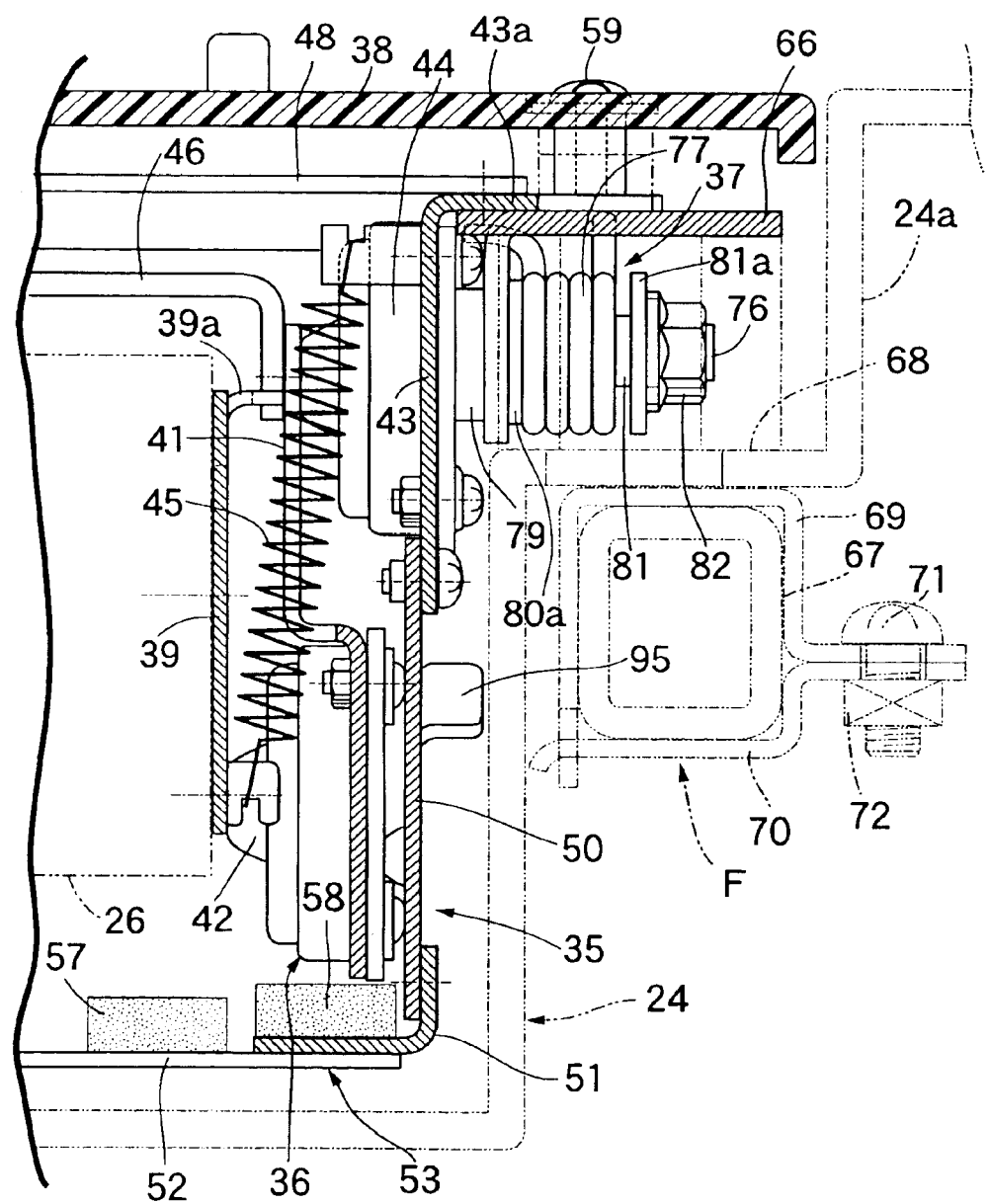
FIG. 10 is a partial cross-sectional view taken along line 10—10 in FIG. 7 wherein the lid plate is attached.

As shown by FIGS. 5 and 6, the trunk 24 includes a main trunk portion 24a having a box-like configuration with a horizontal bottom wall 30 and an open upper portion, and a protrusion 24b which projects downwards from a front lower portion of the main trunk portion 24a. The main trunk portion 24a defines a luggage chamber 31. An accommodating recess 32 formed in the protrusion 24b opens into the bottom wall 30, which is a portion of a wall defining the main trunk portion 24a.

The CD changer 26 is formed into a longitudinally long box shape having an opening 33 for insertion and withdrawal of a CD and includes a plurality of switches 34 on a front surface. The CD changer 26 is disposed in a relatively widthwise central portion of the motorcycle V with the opening 33 and plurality of switches 34 turned rearwards in a longitudinal direction of the motorcycle V, and disposed in the accommodating recess 32.

As shown in FIGS. 7 to 11, the CD changer 26 is supported on a CD changer support 35. The CD changer support 35 includes a floating support means 36 which supports the CD changer 26 in a floating manner, wherein vibration from the vehicle body B is significantly prevented from being transferred to the CD changer 26. A turning support means 37 turns the CD changer 26 from a protruding position (see FIG. 4) wherein the opening 33 and plurality of switches 34 protrude from an inner surface of the bottom wall 30 into the luggage chamber 31, and an accommodated position (see FIGS. 2 and 3) wherein the CD changer 26 is accommodated in the accommodating recess 32. A lid plate 38, formed from a synthetic resin, covers the CD changer 26 in such a manner to close an open end of the accommodating recess 32 so as to be flush with the inner surface of the bottom wall 30 in a state in which the CD changer 26 is in the accommodated position.

Two mounting portions are provided on opposite sides of the CD changer 26 at two points spaced apart from each other in a longitudinal direction of the CD changer 26. A pair of mounting plates 39, 39 are mounted on the mounting portions with inner sides of each mounting plate 39 facing a corresponding side of the CD changer 26. The mounting plates 39 are each mounted, for example, by screw members 40.

The floating support means 36 includes a pair of inner support plates 41, 41 disposed such that an inner side of each inner support plate 41 faces an outer side of the mounting plates 39, 39. A pair of dampers 42 are mounted on each of the inner support plates 41, 41 to support the mounting plates 39, 39, respectively. A pair of outer support plates 43, 43 are disposed so that an inner side of each outer support plate 43 faces an outer side of the inner support plates 41, 41. A pair of dampers 44 are mounted on each of the outer support plates 43, 43 to support the inner support plates 41, 41, respectively. A pair of suspended springs 45 mounted between each of the mounting plates 39, 39 and each of the outer support plates 43, 43 to provide a spring force which counteracts the weight of the CD changer 26.

Each damper 42 and 44, respectively, is a conventional damper having a bag configured into a disk-shape from an elastic material, such as, for example, a rubber or the like, and a high viscosity liquid, such as, for example, grease or the like sealed within the bag, wherein movement of the mounting plates 39, 39 relative to the inner support plates 41, 41 within a vertical plane is buffered by the dampers 42, and movement of the inner support plates 41, 41 relative to the outer support plates 43, 43 within a vertical plane is buffered by the dampers 44.

Upper portions of the pair of left and right inner support plates 41, 41 are connected to each other by a pair of connecting plates 46, 46 spaced longitudinally apart from each other, wherein a distance between the inner support plates 41, 41 is maintained by the connecting plates 46, 46. Each of the pair of left and right outer support plates 43, 43 is configured into a substantially L-shape in cross section to have a mounting jaw 43a, 43a overhanging outwards at an upper end. The mounting jaws 43a, 43a are connected to each other by three connecting plates 47, 48 and 49 spaced apart from one another. Upper portions of vertically extending longitudinal frame plates 50, 50 are fastened to longitudinally intermediate portions of the pair of outer support plates 43, 43. Longitudinally extending transverse frame plates 51, 51, each having a substantially L-shape in cross section, are secured at their intermediate portions to lower portions of the longitudinal frame plates 50, 50, and are further connected at their longitudinally opposite ends to each other by connecting plates 52, 52.

A support frame 53, which surrounds the CD changer 26, includes the outer support plates 43, 43, the connecting plates 47 to 49, 52, 52, the longitudinal frame plates 50, 50, and the transverse frame plates 51, 51, wherein the CD changer 26 is supported in a floating manner by the support frame 53.

An operational opening 54 is defined by the inner support plate 41 and the outer support plate 43 of the support frame 53 to provide access to screw members 40, 40 for mounting the mounting plate 39 to the CD changer 26 from outside of the support frame 53. Another operational opening 55 is provided in the longitudinal frame plate 50 disposed at a location to cover one of the screw members 40, 40 from the side.

A pair of elastic members 56, 56, such as, for example, a sponge, are mounted to each of the connecting plates 47, 49 to oppose an upper surface of longitudinally opposite ends of the CD changer 26. A pair of elastic members 57, such as, for example, a sponge, are mounted to each of the connecting plates 52, 52 to oppose a lower surface of longitudinally opposite ends of the CD changer 26. As a result, contact between the CD changer 26 and the connecting plates 47, 49, 52 caused by a sudden application of a load is minimized by the elastic members 56 and 57. Elastic members 58, 58, such as, for example, a sponge, are mounted to upper surfaces of lower portions of the transverse frame plates 51, 51 to minimize contact by the inner support plates 39, 39 and the dampers 42 with the transverse frame plates 51, 51 caused by a sudden application of a load.

The lid plate 38 covering the CD changer 26 is mounted to the mounting jaws 43a, 43a of the outer support plates 43, 43 of the support frame 53, for example, by a plurality of screw members 59 and weld nuts 60 secured to the mounting jaws 43a, 43a.

Figure 11:
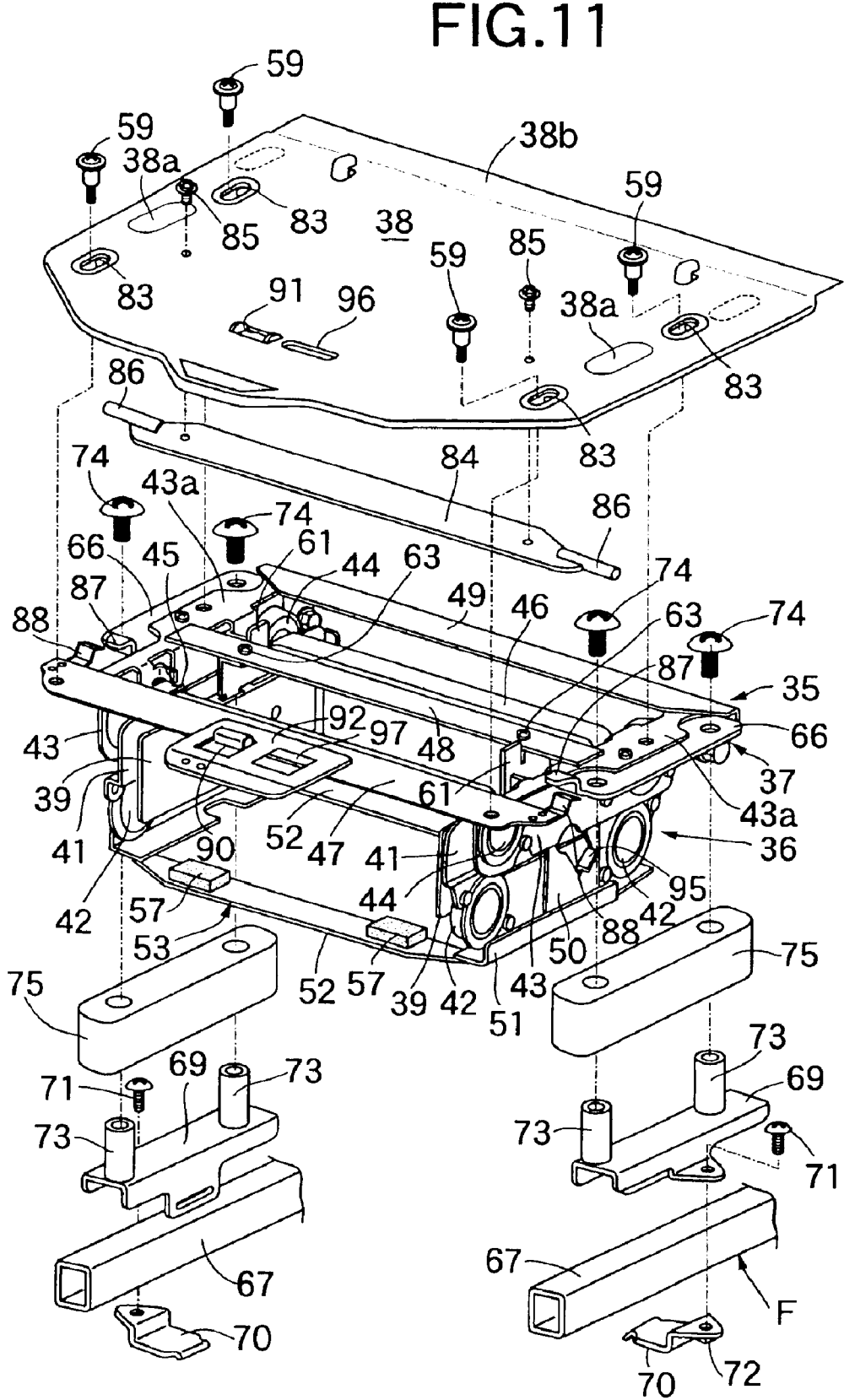
FIG. 11 is an exploded perspective view of the CD changer support.

Before mounting the CD changer 26 to the CD changer-supporting device 35, the positions of the mounting plates 39, 39 are not yet known. Moreover, it is rather difficult to position and mount the mounting plates 39, 39 to opposite sides of the CD changer 26. Therefore, in a state in which the CD changer 26 has been removed, stoppers 61 are detachably set between the connecting plate 48 to connect the upper portions of the outer support plates 41 in the support frame 53 and the inner support plates 41, 41, as shown in FIG. 11.

Figure 12:
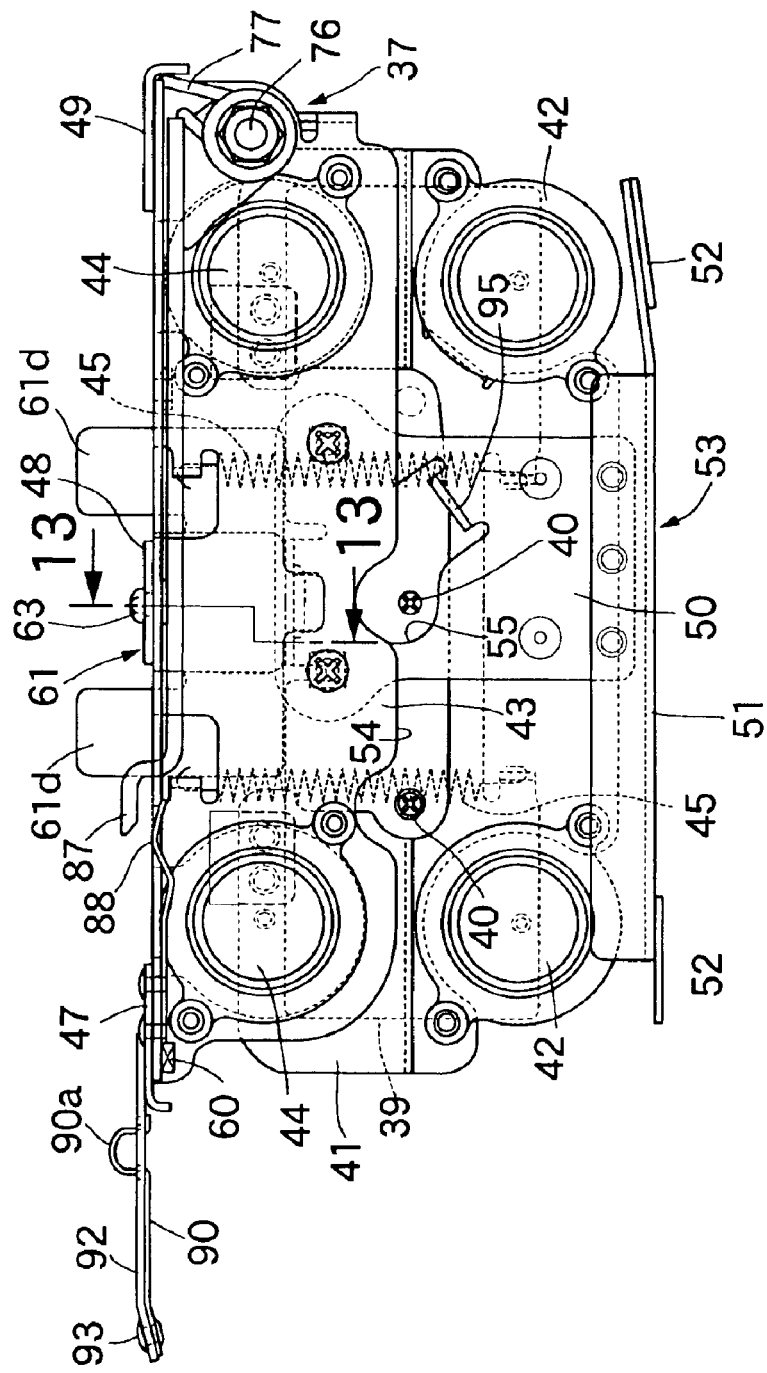
FIG. 12 is a side view of the CD changer support prior to being mounted.
Figure 13:
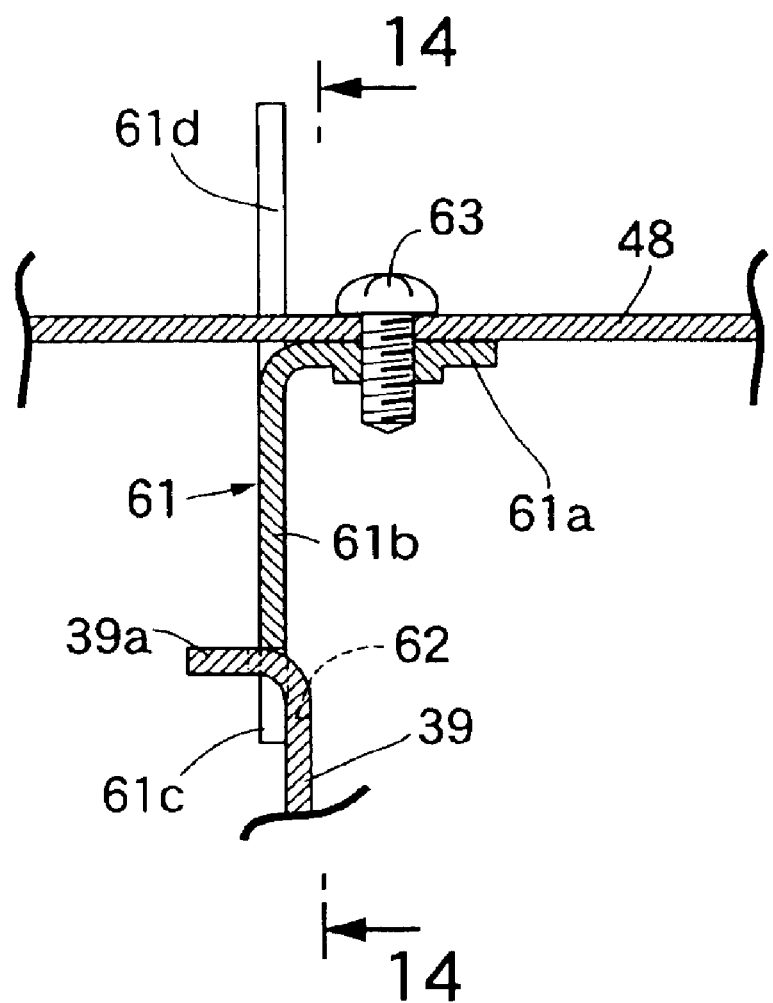
FIG. 13 is an enlarged partial sectional view taken along line 13—13 in FIG. 12.
Figure 14:
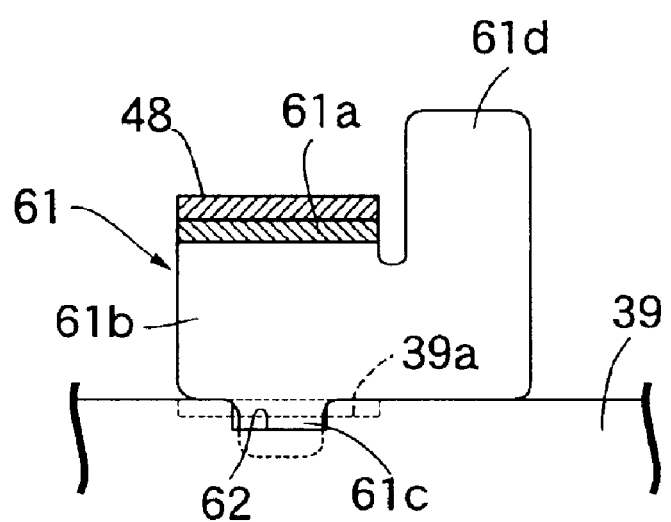
FIG. 14 is a cross-sectional view taken along line 14—14 in FIG. 13.

Referring to FIGS. 12 to 14, an outwardly projecting jaw 39a is integrally provided on the upper portion of the mounting plate 39 at a location corresponding to the connecting plate 48. A positioning bore 62 is provided in the jaw 39a.

Each stopper 61 is inserted into a space between the jaw 39a and the connecting plate 48 to be detachably fastened to the connecting plate 48. Each stopper 61 is integrally provided with a mounting plate portion 61a fastened to the lower surface of the connecting plate 48 by a screw member 63, a distance-maintaining portion 61b extending downward from an outer end of the mounting plate portion 61a to abut against an upper surface of the jaw 39a, a positioning projection 61c inserted into the positioning bore 62 and protruding from a lower end of the distance-maintaining portion 61b, and an ear portion 61d connected to the distance-maintaining portion 61b to protrude upwards from any one of the front and rear of the connecting plate 48. The vertical attitude of the mounting plate 39 is maintained by inserting the positioning projection 61c into the positioning bore 62 to be opposite to an outer surface of the upper portion of the mounting plate 39. The vertical position of the mounting plate 39 biased upwards by the springs 45 is constantly maintained by the distance-maintaining portion 61b abutting against the upper surface of the jaw 41a.

The ear portion 61d protrudes upwards above the connecting plate 48 upon setting the stopper 61, wherein it is easily ascertainable as to whether the stopper 61 has been set. Moreover, stoppers 61 having the same geometric configuration are used for the pair of left and right mounting plates 39, 39. Accordingly, the ear portions 61d are disposed in the rear of the connecting plate 48 on the side of one of the mounting plates 39, 39 and in front of the connecting plate 48 on the side of the other one of the mounting plates 39, 39.

When the stoppers 61 are set between the connecting plates 48 and the mounting plates 39, 39 by tightening the screw members 63, the three-dimensional relative positions of the mounting plates 39, 39 with respect to the support frame 53 are constantly maintained. Thus, it is easy to position the mounting plates 39, 39 on the opposite sides of the CD changer 26 for mounting the mounting plates 39, 39 to the inner support plates 41, 41. In addition, by setting the stoppers 61, the CD changer 26 is fixed and retained so as not to vibrate during transportation of the CD changer support.

The support frame 53 is turnably supported on a pair of base plates 66, 66 through turning support means 37. The base plates 66, 66 are fixed to seat rails 67, 67, which are rectangular shape in cross section and disposed below opposite sides of the trunk 24. The trunk 24 is provided at a rear portion of a vehicle body frame F, which is a portion of the vehicle body B.

As shown in FIGS. 5 and 6, support steps 68, 68 are formed on laterally opposite sides of the main trunk portion 24a of the trunk 24 and disposed above the seat rails 67, 67. The base plates 66, 66 are disposed below the mounting jaws 43a, 43a of the outer support plates 43, 43 and above the support steps 68, 68.

Base support frames 69, 69 are placed on upper portions of the seat rails 67, 67 and below the support steps 68, 68. One end of a band 70 engages one end of each base support frame 69, 69 in a circumferential direction of each seat rail 67, while the other end of the band 70 is fastened to the other end of each base support frame 69, 69 in the circumferential direction of the seat rail 67 by bolts 71 and welded nuts 72. Namely, the base support frames 69 are secured to the seat rails 67 below the support steps 68, 68 of the trunk 24. Lower ends of a pair of cylindrical support legs 73 are secured to each base support frame 69 from which each support leg 73 extends upwards through the support step 68.

Upper ends of the support legs 73 abut against lower surfaces of the base plates 66, 66. A pair of screw members 74 are inserted through each of the base plates 66, 66, and threadably fitted into upper portions of the support legs 73. Thus, the base plates 66 are fixed to the seat rails 67, 67 of the vehicle body frame F through the support legs 73 by tightening the screw members 74.

Spacers 75, 75 are interposed between the base plates 66, 66 and the support steps 68, 68 of the trunk 24, wherein the support legs 73 pass through the spacers 75, 75.

Figure 15:
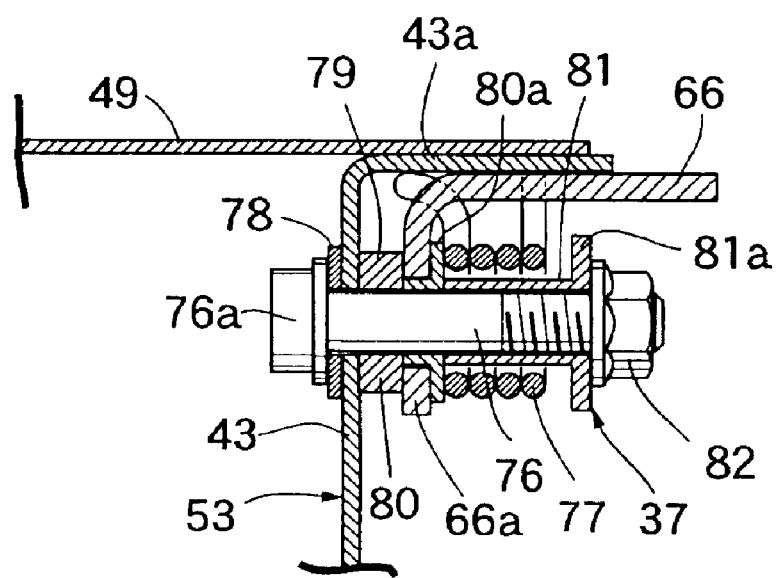
FIG. 15 is an enlarged cross-sectional view taken along line 15—15 in FIG. 5.

As shown in FIG. 15, the turning support means 37 is mounted between the rear end of the outer support plate 43 and the support plate portion 66a provided integrally at the rear end of the base plate 66 and opposite the rear end of the outer support plate 43. The turning support means 37 includes a bolt 76 which passes through the support plate portion 66a and which is fixed to the outer support plate 43, and a torsion spring 77 mounted between the base plate 66 and the outer support plate 43.

A first collar 79 is interposed between the support plate portion 66a and the outer support plate 43. A second collar 80, including a jaw 80a adapted to sandwich the support plate portion 66a between the jaw 80a and the first collar 79, is mounted to the support plate portion 66a to coaxially abut against the first collar 79. A third collar 81, mounted with one end coaxially abutting against the jaw 88a, is integrally provided with a jaw 81a at the other end. The bolt 76 is inserted through the outer support plate 43 and the first, second, and third collars 79 to 81 with a washer 78 interposed between an enlarged-diameter head 76a of the bolt 76 and the outer support plate 43. The bolt 76 is fixed to the outer support plate 43 by tightening a nut 82 threadably fitted over a protrusion of the bolt 76 extending from the third collar 81 until the nut 82 abuts against the jaw 81a of the third collar 81. The outer support plate 43 is turnably supported on the base plate 66 through the bolt 76. The torsion spring 77 is mounted between the base plate 66 and the outer support plate 43 to surround the third collar 81.

The outer support plates 43, 43, i.e., the support frame 53, are supported on the base plate 66, 66 by the turning support means 37, 37. Thus, the support frame 53 can be turned between a protruding position, in which the front surface of the CD changer 26 protrudes from the inner surface of the bottom wall 30 into the luggage chamber 31, and an accommodating position, in which the CD changer 26 is accommodated in the accommodating recess 32. The support frame 53 is biased by the spring toward the protruding position.

The lid plate 38 is mounted to the outer support plates 43, 43 and is slidable between a front engaged position and a rear disengaged position established in the longitudinal direction of the CD changer 26. The screw members 59 used to mount the lid plate 38 to the outer support plates 43, 43 are inserted through longitudinally elongated bores 83 provided in the lid plate 38. Accordingly, the lid plate 38 is able to slide between the engaged position and the disengaged position to engage with and disengage from the outer support plates 43, 43.

Longitudinally extending bulges 38a, 38a are integrally formed on opposite sides of a longitudinally intermediate portion of the lid plate 38 and bulge upwards. A plate 84, which extends in a widthwise direction of the lid plate 38 and has opposite ends facing the bulges 38a, 38a, is fastened to an inner surface of the lid plate 38 by a pair of screw members 85, 85. Rod members, which function as engagement members 86, 86, are secured to opposite ends of the plate 84 and extend in a lateral direction of the CD changer 26. The engagement members 86, 86 are mounted on opposite sides of the lid plate 38.

Each base plate 66 is integrally formed at a front end with a locking portion 87, which is adapted to engage the engagement members 86 from below when the lid plate 38 is in the engaged position, thereby maintaining the accommodated position of the CD changer 26. The locking portions 87 are accommodated within the bulges 38a of the lid plate 38. The locking portions 87 are disengaged from the engagement members 86 when the lid plate 38 is slid from the engaged position to the disengaged position. When the locking portions 87 are disengaged from the engagement members 86, the lid plate 38 is turned to the protruding position by the spring force of the torsion spring 77 of the turning support means 37.

Click springs 88 are mounted on the support frame 53 to facilitate the engagement members 86 climbing over the click springs 88 when the lid 38 slides between the disengaged position and the engaged position. Each click spring 88 comprises a leaf spring having an upward-curving intermediate portion. The click springs 88 are mounted to opposite ends of the connecting plate 47 at a front end of the support frame 53 wherein the click springs 88 face the locking portions 87 when the CD changer is in the accommodated position.

A tongue portion 38b, having a small wall thickness for flexibility, is integrally formed at the rear end of the lid plate 38 to make sliding contact with the bottom wall 30 of the trunk 24.

Figure 16:
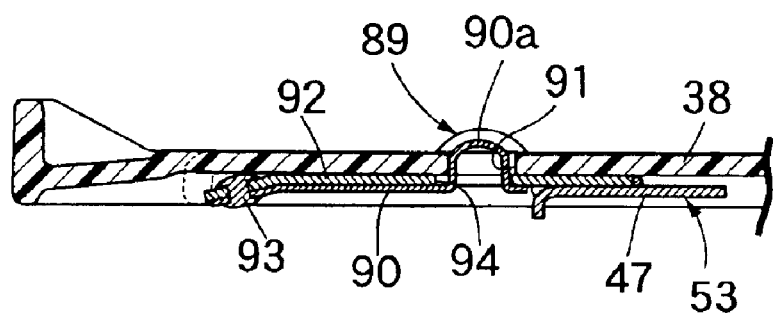
FIG. 16 is a partial cross-sectional view taken along line 16—16 in FIG. 8.
Figure 17:
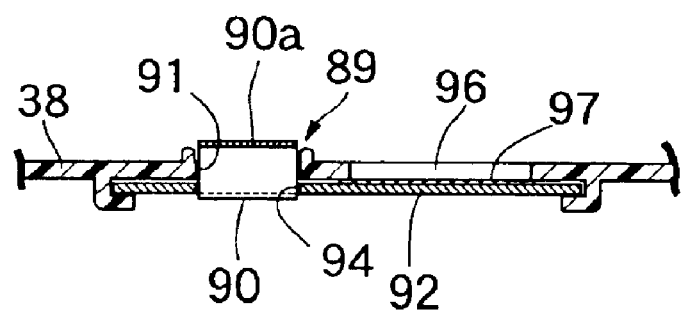
FIG. 17 is a partial cross-sectional view taken along line 17—17 in FIG. 8.

As shown in FIGS. 16 and 17, a locking mechanism 89, provided between the lid plate 38 and the support frame 53, locks the lid plate 38 in the engaged position and releases the locked state by manual operation. The locking mechanism 89 includes a leaf spring 90 fixed to the support frame 53 and an engagement bore 91 provided in the lid plate 38. A portion of the leaf spring 90 is resiliently engaged with the engagement bore 91 when the lid plate 38 is in the engaged position.

A flat, plate-shaped spring-supporting plate 92 extending forward from the connecting plate 47 is secured to a widthwise central portion of the connecting plate 47 provided at the upper portion of the front end of the support frame 53. The leaf spring 90 is secured at a front end to the spring-supporting plate 92, for example, by a pair of rivets 93, 93. The leaf spring 90 has a resilient engagement portion 90a formed at a rear portion and bulges upward. The spring-supporting plate 92 is provided with a through-bore 94 through which the resilient engagement portion 90a passes.

Figure 18:
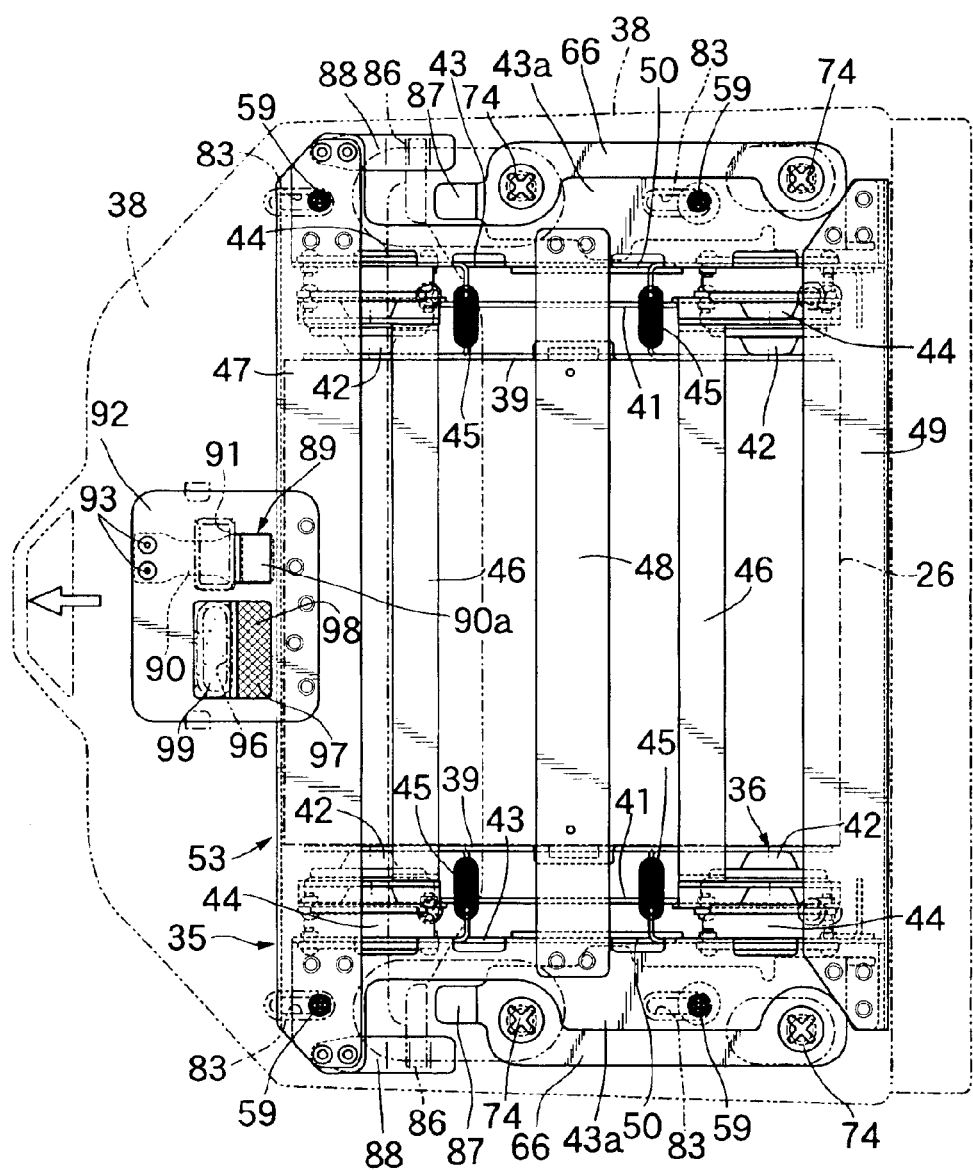
FIG. 18 is a plan view similar to FIG. 8, wherein the lid plate is in a disengaged position.
Figure 19:
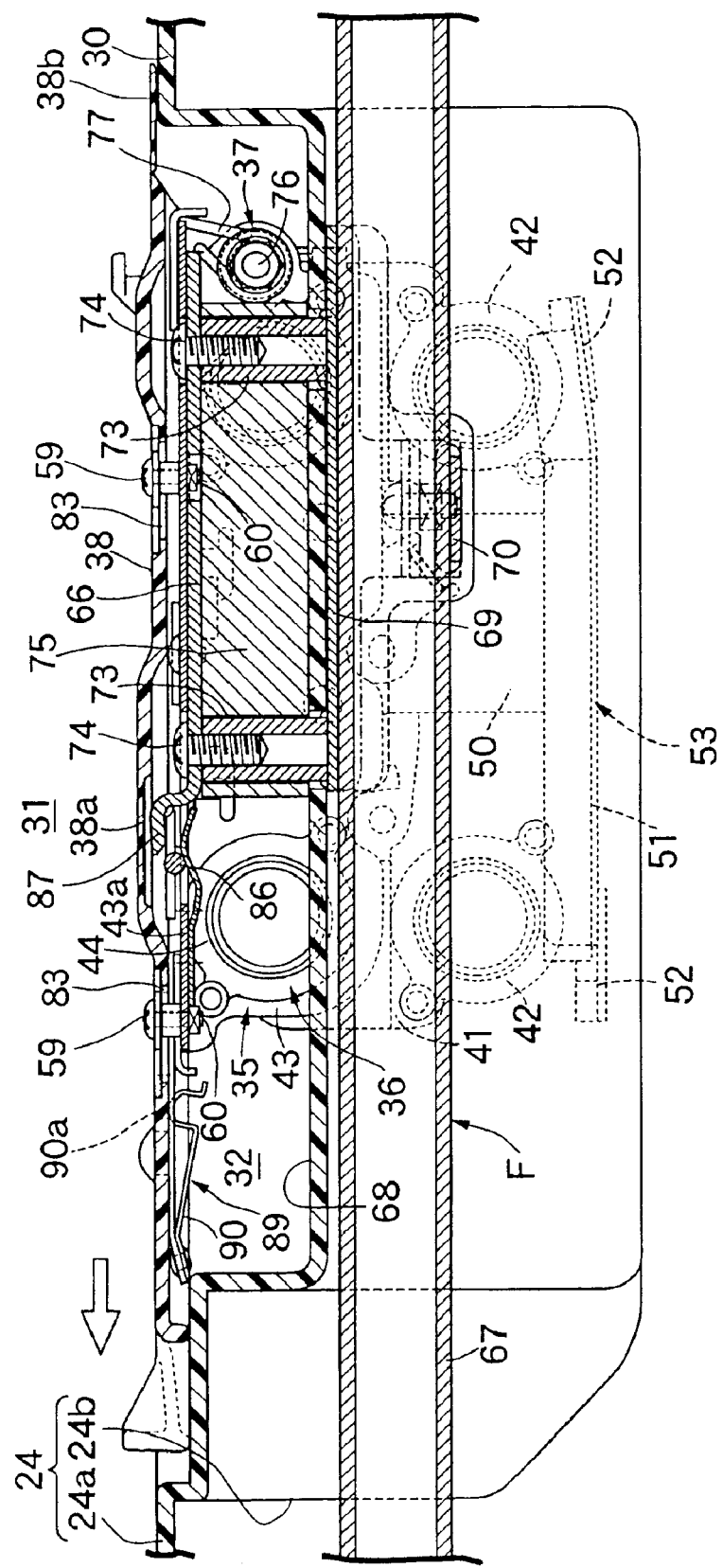
FIG. 19 is an enlarged cross-sectional view similar to FIG. 15, wherein the lid plate is in the disengaged position.

The resilient engagement portion 90a is capable of engaging the engagement bore 91 in the lid plate 38 when the lid plate 38 is in the engaged position. In a state wherein the resilient engagement portion 90a engages the engagement bore 91, the lid plate 38 is retained in the engaged position. When the engagement of the resilient engagement portion 90a with the engagement bore 91 is released by pushing the resilient engagement portion 90a downward, the lid plate 38 slides forward to the disengaged position while the resilient engagement portion 90a makes sliding contact with the inner surface of the lid plate 38, as shown in FIGS. 18 and 19. The forward sliding of the lid plate 38 releases the engagement between the engagement members 86 and the locking portions 87.

Figure 20:
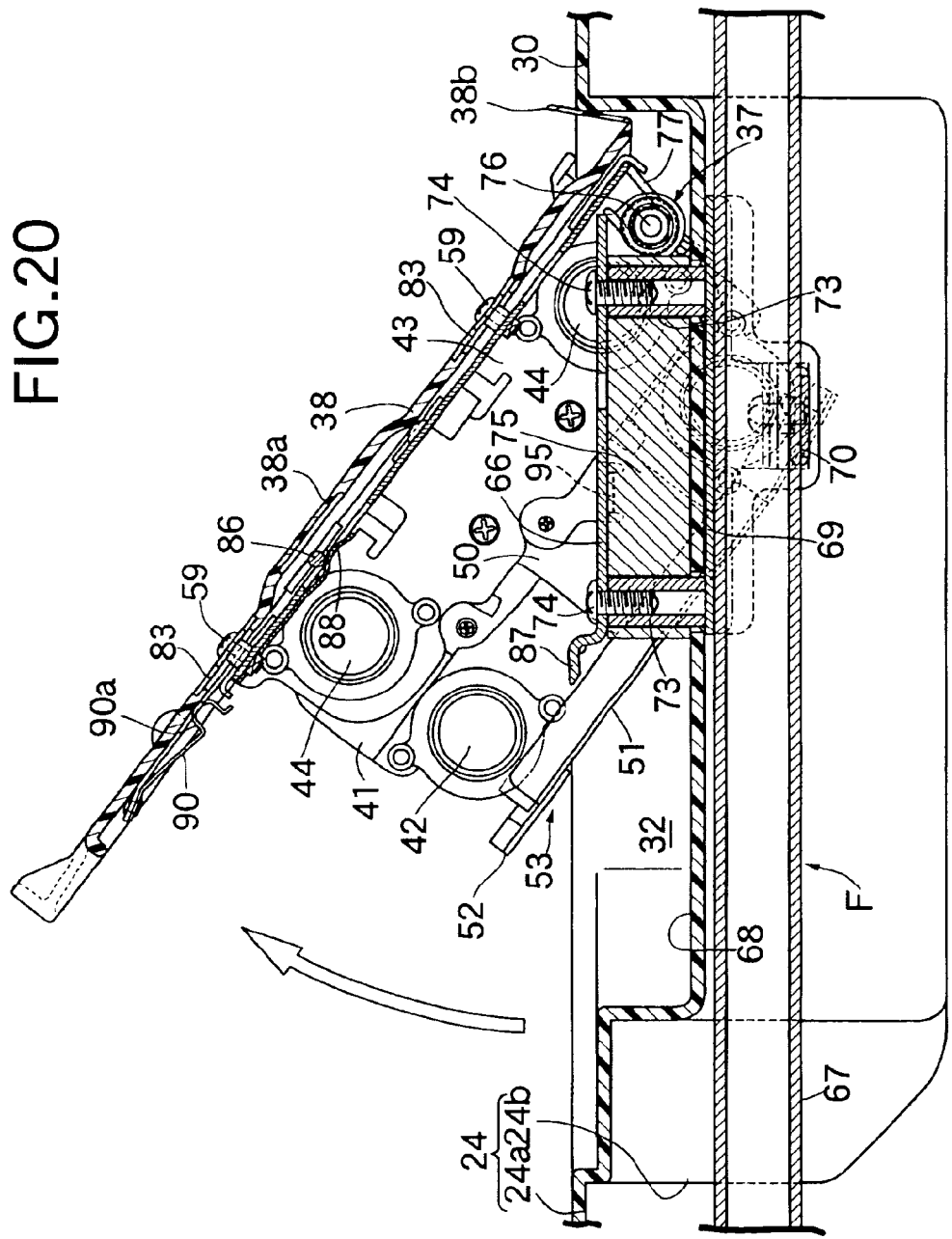
FIG. 20 is a side view, wherein a support frame is turned so the CD changer is in a protruding position.

In response to the release of the engagement between the engagement members 86 and the locking portions 87, the support frame 53 is sprung upwards, as shown in FIG. 20, by the spring force of the torsion springs 77. Accordingly, the CD changer floatably supported by the support frame 53 is brought into the protruding position. To define an end of the turning movement of the support frame 53 to the protruding position, the longitudinal frame plates 50 of the support frame 53 are integrally provided with restricting projections 95, which engage with the base plates 66 from below. In response to the turning of the support frame 53 to the protruding position, the tongue portion 38b of the lid plate 38 is buckled while keeping contact with a rear end edge of the accommodating recess 32, as shown in FIG. 20.

A window 96 is provided in the lid plate 38 sideways of the engagement bore 91. An indicator 97 is provided on the spring-supporting plate 92 secured to the support frame 53, and changes the indication of a portion facing the window in response to the sliding of the lid plate 38 between the engaged position and disengaged position.

The indicator 97 is formed, for example, by adhering a label to the upper surface of the spring-supporting plate 92. The indicator 97 includes a first indicating portion 98, which faces the window 96 when the lid plate 38 is in the engaged position, and a second indicating portion 99, which faces the window 96 when the lid plate 38 is in the disengaged position. The first indicating portion 98 is colored, for example, green, and the second indicating portion 99 is colored, for example, red.

The operation of the present embodiment will be described below. The floating support means 36 supports, in a floating manner, the mounting plates 39, 39 mounted to the opposite sides of the CD changer 26 on the base plates 66, 66, which are disposed on opposite sides of the CD changer 26 and fixed to the vehicle body B. The floating support means 36 includes the pair of inner support plates 41, 41 provided on an outer side of the mounting plates 39, 39 relative to the CD changer 26. The dampers 42, which connect the inner support plates 41 and the mounting plates 39 to each other at two front points and two rear points, buffer the displacement of the mounting plates 39 within the vertical plane relative to the inner support plates 41. The outer support plates 43, 43 are supported on the base plates 66 and are provided on an outer side of the inner support plates 41 relative to the CD changer 26. Another set of dampers 44, which connect the outer support plates 43 and the inner support plates 41 to each other at two front points and two rear points, buffer the displacement of the inner support plates 41 in the vertical plane relative to the outer support plates 43. Suspended springs 45 are mounted on each side of the CD changer 26 between the mounting plates 39 and the outer support plates 43 to exert the spring force which counteracts the weight of the CD changer 26.

With the above-described structural arrangement of the floating support means 36, vibration from the base plates 66, 66 supported on the vehicle body frame F of the vehicle body B is damped by the shock-absorbing effects of the front and rear pairs of dampers 44. The vibration is then transmitted from the outer support plates 43, 43 to the inner support plates 41, 41 and damped by the shock-absorbing effects of the front and rear pairs of the dampers 42. The vibration is then transmitted from the inner support plates 41, 41 to the CD changer 26. Thus, the vibration from the vehicle body B is significantly prevented from being transmitted to the CD changer 26 by the large damping forces provided by the four dampers in each side, that is, by the eight dampers in total, as well as by damping forces provided by suspended springs. Therefore, even if a large shock acts on the vehicle body, the shock is minimized to reliably prevent the CD from skipping in the CD changer. Furthermore, damage from the shock is reliably prevented from being inflicted on the CD changer.

The base plates 66, 66 are secured to upper portions of the pairs of support legs 73, which are secured to the vehicle body frame F on opposite sides of the CD changer 26. The CD changer 26 is supported on the base plates 66, 66 through the floating support means 36. Therefore, even if the vibration of the vehicle body frame F is transmitted to the trunk 24, the vibration cannot be transmitted from the trunk 24 to the CD changer 26. Also, the vibration of the vehicle body frame F is damped by the floating support means 36 and transmitted to the CD changer 26 so that any vibration acting on the CD changer 26 is suppressed.

Further, the lid plate 38 is mounted to the support frame 53 and slides between the disengaged position, which is frontward in the longitudinal direction of the CD changer 26, and the engaged position, which is rearward in the longitudinal direction of the CD changer 26. The locking portions 87 maintain the accommodated position of the CD changer 26 by bringing the engagement members 86 into engagement with the locking portions 87, and are provided on the base plates 66 so the locking portions 87 are disengaged from the engagement members 86 in response to the sliding of the lid plate 38 toward the disengaged position. The locking mechanism 89, which locks the lid plate 38 in the engaged position and releases the locked state by manual operation, is provided between the lid plate 38 and the support frame 53.

Therefore, to turn the CD changer 28 from the accommodated position to the protruding position, it is necessary to slide the lid plate 38 from the engaged position to the disengaged position after manually bringing the locking mechanism 89 into the unlocking state. Thus, it is possible to reliably prevent the CD changer 26 from being undesirably turned due to the vibration of the vehicle body B, and to turn the CD changer 26 to the protruding position only when necessary.

Moreover, the click springs 88 allow an operator to sense a clicking feeling during operation when sliding the lid plate 38 between the engaged position and the disengaged position.

The engagement members 86, 86 are mounted on the inner surface of the lid plate 38 and extend in the lateral direction of the CD changer 26. The locking portions 87 are provided at the front ends of the base plates 66 to engage the engagement members 86, 86 from below. The click springs 88 each include a leaf spring having an upward-curving intermediate portion, and are mounted to opposite ends of the connecting plate 47 at the front end of the support frame 53 in such a manner that the click springs 88 face the locking portions 87 in a state in which the CD changer is in the accommodated position. Therefore, increasing the size of the support frame 53 in the thickness-wise direction is avoided and the accommodating recess 32 is prevented from being deepened.

Further, the window 96 is provided in the lid plate 38, and the indicator 97 changes the indication of a portion facing the window in response to the sliding of the lid plate 38 between the engaged position and disengaged position. Therefore, the operator easily recognizes the slid position of the lid plate 38.

Although the embodiment of the present invention has been described, it will be understood that the present invention is not limited to the above-described embodiment, and various modifications in design may be made without departing from the scope of the present invention defined in claims.

What is claimed is:

1. A structure for accommodating a CD changer, comprising:

an accommodating recess which is provided in a luggage-chamber forming wall forming a luggage chamber and which accommodates a CD changer having an opening in its front surface for insertion and withdrawal of a CD; and a turning support means which is provided between a support frame for supporting the CD changer in a floating manner and a pair of left and right stationary base plates;

the turning support means being capable of turning the CD changer between a protruding position in which the front surface of the CD changer protrudes from an inner surface of the luggage-chamber forming wall into the luggage chamber and a accommodated position in which the CD changer is accommodated in the accommodated recess;

the turning support means being adapted to bias the CD changer toward the protruding position;

the CD changer being covered with a lid plate adapted to close an open end of the accommodating recess in a state in which the CD changer is in the accommodated position;

wherein an engagement portion is provided on the lid plate mounted to the support frame and capable of sliding between a disengaged position on a front side in a longitudinal direction of the CD changer and an engaged position on a rear side in the longitudinal direction;

wherein each of the base plates has a locking portion which engages with the engagement portion to maintain the CD changer at the accommodated position in a state in which the lid plate is at the engaged position, and which releases the engagement with the engagement portion, in response to the sliding of the lid plate to the disengaged position, to permit the CD changer to turn to the protruding position; and wherein a locking mechanism capable of locking the lid plate at the engaged position and releasing the locked state by a manual operation is provided between the lid plate and the support plate.

2. A structure for accommodating a CD changer according to claim 1, further including a click spring which is mounted on the support frame and which resiliently causes the engagement portion to climb over the click spring during the sliding of the lid plate between the disengaged position and the engaged position.

3. A structure for accommodating a CD changer according to claim 2, wherein the engagement portion is provided on an inner surface of the lid plate to extend in a lateral direction of the CD changer; the locking portion is provided at a front end of each of the base plates so that the engagement portion is engaged with the locking portion from below; and the click spring comprising a leaf spring is fixed to the support frame so that it is opposed to the locking portion from front in a state in which the CD changer is in the accommodated position.

4. A structure for accommodating a CD changer according to any of claims 1 to 3, wherein the lid plate is provided with a window, and the support frame is provided with an indicator adapted to change the indication of a portion facing the window in response to the sliding of the plate between the engaged position and the disengaged position.

5. A structure for accommodating a CD changer according to claim 1, wherein the CD changer is accommodated in a trunk disposed above a rear fender covering a rear wheel of a motorcycle from above; the base plates are secured to support legs secured to a vehicle body frame on opposite sides of the CD changer; and the CD changer is supported on the base plates through a floating support means adapted to damp a vibration from the vehicle body frame.

* * * * *